Patented June 17, 1947

2,422,588

UNITED STATES PATENT OFFICE 2,422,588

MANUFACTURE OF DRIED CITRUS FRUIT PASTE

Zdenka Samisch, Rehoboth, Palestine

No Drawing. Application September 9, 1944, Serial No. 553,471. In Palestine April 28, 1944

8 Claims. (Cl. 99—206)

This invention relates to the manufacture from citrus fruit of a dried paste from which a marmalade, practically not distinguishable from that made from fresh fruit, can be prepared by mixing the paste with sugar and water and, if required, heating the mixture. The term "marmalade," as used in the present specification, is meant to cover also such related products as jam, jelly or candy, unless one of these products is particularly distinguished in the context from the other ones.

It is known that from pulped fresh fruit, a dried paste can be prepared in sheets by spreading the pulp in a thin layer on water-impermeable trays or boards and drying it. This has been practised for a long time in the countries of the Middle East with apricot and other fruit, the pulp of which is dried in the air on wooden trays impregnated with paraffin or crystal oil. The application of this process to many kinds of fruit, with artificial or sun-drying, has also been described in the literature, for example, in The Fruit Products Journal, vol. 13, No. 8 (1934). Although a dried citrus fruit paste can be prepared by these known processes, no genuine citrus marmalade can be obtained from such paste by the mere addition thereto of water and sugar and the heating of the mixture, for there is no sufficient jellification of such mixture.

It has now been found that a dried paste suitable for the preparation of citrus marmalade can be obtained from different varieties of citrus fruit, for example, orange, bitter orange, grapefruit, lime, mandarin, by the dehydration of fresh fruit pulp if, on the one hand, the flavedo is largely excluded from the pulp while the albedo is largely retained, and on the other hand, the acidity of the pulp is adjusted within certain limits.

Accordingly, this invention consists in a process of manufacturing a dried citrus fruit paste, wherein fresh citrus fruit is wholly or largely freed from the flavedo; the fruit so treated is comminuted by slicing, cutting into pieces or pulping; the acidity of the comminuted fruit is adjusted to a pH value of between 2.5 and 4.5; the mass is concentrated by being heated, and the heated mass is dehydrated in a manner known per se.

The flavedo may be removed, for example, by peeling or rasping, or by carving the fruit by means of a curved, spoon-shaped knife which lifts the pulp and larger part of the albedo from within.

The adjustment of the acidity may be done by the addition to the fruit of a certain proportion of sour citrus fruit, mainly lemon. Such additional fruit may either be admixed as comminuted whole fruit from which the bulk of the flavedo has been removed as aforesaid, or its pulp or juice alone may be used. Instead of or in addition to lemon, some edible acid, e. g. citric or tartaric acid, preferably dissolved beforehand in water or fruit juice, may serve for acidulating the fruit pulp.

In order to prevent the comminuted fruit from being scorched when it is heated, some water or fruit juice may be added thereto before and/or during heating, a proportion of, say, 10 per cent. by weight being suitable for this purpose.

The addition of sugar to the fruit pulp before, during or after the heating, but at all events prior to dehydration, has proved to improve the texture as well as the colour and taste of the final product. A comparatively low proportion of added sugar, say from 2.5 to 8 per cent. by weight, calculated to the concentrated pulp, will do for this purpose, but even higher amounts thereof may be added, in which case the dried paste obtained lends itself particularly well for the preparation of an excellent candy.

The product according to this invention can be further improved if sulfur dioxide, or a sulfite, is added to the mass prior to dehydration. The sulfur dioxide may be introduced in gaseous form into the fruit mass which readily absorbs the gas, or be admixed thereto in aqueous solution. A suitable amount to be added is of the magnitude of 0.05 to 0.3% by weight of $SO_2$, calculated to the concentrated mass.

The sulfur dioxide or sulfite prevents oxidation and the concomitant darkening of the colour of the mass and destruction of vitamin C, and, besides, repels insects during drying and storing.

It has also been found that deterioration of the taste and loss of vitamin C by oxidation can be counteracted by an addition, e. g. of the order of about 5 per cent., of apricot juice or pulp, or carrot juice or pulp.

The process according to the invention may be modified thereby that the albedo is separated from the rest of the pulp and boiled with water for a longer time than the latter, and the boiled albedo is incorporated with the concentrated pulp prior to the dehydration. Or else, to a pulp obtained from the whole fruit, as described hereinbefore, additional boiled albedo may be admixed. By such modification of the process, the jellifying properties of the dried paste are improved, which is of the utmost importance in the preparation of marmalade from the paste.

If it is intended to obtain a paste that is free from coarser solids, the mass may, in the course of its being concentrated or after completion of the concentration, be passed through a pulping machine or strained through a sieve or filtered through cloth, if desired, under pressure. Filtration is called for where the dried paste is to serve as a starting material for the preparation of jelly.

The dehydration can be carried out in any suitable manner, for example, by pouring the mass out on trays which are kept in the air, in artificially heated and aerated drying chambers heated to about 45 to 70° C., or in vacuum drying chambers kept at a temperature of, for example 40 to 60° C. Or else, heated rotary drums or rollers may be used for drying. As a source of heat, infrared rays may, for example, be employed.

The following examples serve to illustrate the invention, it being understood that the invention is not limited thereto.

Example 1

Oranges and lemons are halved and scooped with a spoon-shaped knife so as to lift the whole flesh and the bulk of the albedo out of a thin rind consisting mainly of the flavedo with a small part of the albedo, and the fruit is cut into small pieces.

Then 8 parts by weight of the comminuted oranges are mixed with 1 part of the comminuted lemons and 1 part of water or orange juice and the mixture is heated to boiling for about 30 to 40 minutes until it is thoroughly disintegrated and can be strained through a sieve. If the strained mass is still not very viscous it is further concentrated by heating until its contents of soluble solids amount to about 14 to 17% by weight.

To this mass, 8% by weight of sliced peel, previously boiled with water until soft, 0.1% of $SO_2$ in the form of a concentrated aqueous solution of sulfur dioxide or alkali metabisulfite, and 0.1% of citrus essential oil are admixed, whereafter the mass is dehydrated. Instead of admixing essential oil, one may add, or leave in the mass from the outset, small amount of flavedo.

From the leather-like sheets of dried paste thus obtained, a marmalade can be made by mixing 7 to 10 parts by weight of the paste with about 60 to 65 parts of sugar and with water up to a total weight of 100 parts, and heating the mixture up to boiling. The dried paste can also serve as a food without further preparation.

Example 2

If the mass, in addition to being strained as described in Example 1, is subsequently filtered through a fine filter cloth and, if desired, added to with sliced and boiled peel, $SO_2$, and essential oil as in Example 1, a paste is obtained by the dehydration that can serve for the preparation of jelly.

Example 3

Oranges and lemons are freed from the flavedo as described in Example 1, and a part, say a quarter, of the oranges so treated are cut into cubes and set apart while the rest is more finely comminuted, mixed with the lemons, heated and strained, all this as described in Example 1. After straining, the cubes set apart are admixed and the mixture is further heated for a few minutes and then dehydrated. In this manner, one obtains a pulp which contains a certain proportion of meat and is a suitable raw material for the preparation of marmalade.

Example 4

In the process according to Example 1, 1 part by weight of apricot pulp is substituted for 1 part of oranges, whereby a product of pleasant light colour and agreeable taste is obtained.

Example 5

In the process according to Example 1, 5 to 10% by weight of sugar are admixed to the concentrated mass in addition to the sliced peel and other ingredients. The product is especially suitable for the preparation of candy but can equally well be used for making marmalade.

Example 6

If in the process according to Example 1, 6 parts of grapefruit are substituted for the corresponding amount of orange, a paste suitable for the preparation of bitter marmalade is obtained.

A similar result can be obtained by using bitter orange instead of the whole amount or bulk of orange.

I claim:

1. A process of manufacturing leather-like sheets of dehydrated citrus fruit paste containing substantially all the ingredients of the fresh fruit except the bulk of the ethereal oils, comprising removing from fresh citrus fruit at least the major part of the flavedo, comminuting the remainder of the fruit, adjusting the acidity of the mass to a pH value of between about 2.5 and 4.5 by the addition of citrus fruit of higher acidity, boiling it under atmospheric pressure until it forms a highly viscous mass, adding thereto sugar, spreading the mass in a thin layer and drying it.

2. A process of manufacturing leather-like sheets of dehydrated citrus fruit paste containing substantially all the ingredients of the fresh fruit except the bulk of the ethereal oils, comprising removing from fresh citrus fruit at least the major part of the flavedo, comminuting the remainder of the fruit, adjusting the acidity of the mass to a pH value of between about 2.5 and 4.5 by the addition of comminuted lemon freed from at least the major part of the flavedo, boiling it under atmospheric pressure until it forms a highly viscous mass, adding thereto sugar, spreading the mass in a thin layer and drying it.

3. A process of manufacturing leather-like sheets of dehydrated citrus fruit paste containing substantially all the ingredients of the fresh fruit except the bulk of the ethereal oils, comprising removing from fresh citrus fruits at least the major part of the flavedo, comminuting the remainder of the fruit, adjusting the acidity of the mass to a pH value of between about 2.5 and 4.5 by the addition of lemon juice, boiling it under atmospheric pressure until it forms a highly viscous mass, adding thereto sugar, spreading the mass in a thin layer and drying it.

4. A process of manufacturing leather-like sheets of dehydrated citrus fruit paste containing substantially all the ingredients of the fresh fruit except the bulk of the ethereal oils, comprising removing from fresh citrus fruit at least the major part of the flavedo, comminuting the remainder of the fruit, adjusting the acidity of the mass to a pH value of between about 2.5 and 4.5 by the addition of an edible acid, boiling it under atmospheric pressure until it forms a highly viscous mass, adding thereto sugar, spreading the mass in a thin layer and drying it.

5. A process of manufacturing leather-like sheets of dehydrated citrus fruit paste containing substantially all the ingredients of the fresh fruit except the bulk of the ethereal oils comprising removing from fresh citrus fruit at least the major part of the flavedo, comminuting the remainder of the fruit, adjusting the acidity of the mass to a pH value of between about 2.5 and 4.5, boiling it under atmospheric pressure, straining the boiled mass while hot and boiling it further until it forms a highly viscous mass, adding thereto sugar, spreading the mass in a thin layer and drying it.

6. A process of manufacturing leather-like sheets of dehydrated citrus fruit paste containing substantially all the ingredients of the fresh fruit except the bulk of the ethereal oils, comprising removing from fresh citrus fruit at least the major part of the flavedo, separating from the remainder of the fruit the major part of the albedo, comminuting the remainder, adjusting the acidity of the comminuted remainder to a pH value of between about 2.5 and 4.5, separately boiling under atmospheric pressure the albedo in water and said remainder, the former for a longer time than the latter, re-uniting the albedo, plus the water in which it has been boiled, with said boiled remainder, obtaining a highly viscous mixture, adding thereto sugar, spreading the latter in a thin layer and drying it.

7. A process of manufacturing leather-like sheets of dehydrated citrus fruit paste containing substantially all the ingredients of the fresh fruit except the bulk of the ethereal oils, comprising removing from fresh citrus fruit at least the major part of the flavedo, comminuting the remainder of the fruit, adjusting its acidity to a pH value of between about 2.5 and 4.5 and boiling it under atmospheric pressure until it forms a highly viscous mass, obtaining the albedo from another portion of citrus fruit, boiling it in water and adding the boiled albedo and the water in which it has been boiled to said viscous mass, adding thereto sugar, spreading the mixture in a thin layer and drying it.

8. A process of manufacturing leather-like sheets of dehydrated citrus fruit paste containing substantially all the ingredients of the fresh fruit except the bulk of the ethereal oils, comprising removing from fresh citrus fruit at least the major part of the flavedo, comminuting the remainder of the fruit, adjusting the acidity of the mass to a pH value of between about 2.5 and 4.5, boiling it under atmospheric pressure until it forms a highly viscous mass, adding thereto sugar, spreading the mass in a thin layer and drying it.

ZDENKA SAMISCH.

REFERENCES CITED

The following references are of record in the file of this patent:

UNITED STATES PATENTS

| Number | Name | Date |
| --- | --- | --- |
| 793,614 | Sherman | June 27, 1905 |
| 1,068,047 | Ellis | July 22, 1913 |
| 1,197,442 | Burke | Sept. 5, 1916 |
| 1,361,079 | McDill | Dec. 7, 1920 |
| 2,143,642 | Bias | Jan. 10, 1939 |
| 2,325,360 | Ayers | July 27, 1943 |
| 2,357,895 | Higby | Sept. 12, 1895 |
| 2,217,261 | Stevens | Oct. 8, 1940 |

OTHER REFERENCES

"Commercial Fruit and Vegetable Products," by V. V. Cruess, 1st edition, published 1924 by McGraw-Hill Book Co. Inc., New York, pages 301, 302, and 319.